US011536081B1

(12) United States Patent
Goetz et al.

(10) Patent No.: US 11,536,081 B1
(45) Date of Patent: Dec. 27, 2022

(54) ADJUSTABLE LOCKER SYSTEM

(71) Applicant: WELLS FARGO BANK, N.A., San Francisco, CA (US)

(72) Inventors: Darren M. Goetz, San Francisco, CA (US); Chris Kalaboukis, San Jose, CA (US); Lisa R. Magana, San Francisco, CA (US); Andrew L. Martinez, San Francisco, CA (US); Uma Meyyappan, Fremont, CA (US); Dennis E. Montenegro, Concord, CA (US); Marla M. Pacis, Daly City, CA (US); Timothy R. Ward, Mesa, AZ (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 246 days.

(21) Appl. No.: 17/073,619

(22) Filed: Oct. 19, 2020

Related U.S. Application Data

(63) Continuation of application No. 16/177,292, filed on Oct. 31, 2018, now Pat. No. 10,808,449.

(51) Int. Cl.
| *G06Q 10/08* | (2012.01) |
| *E05B 63/00* | (2006.01) |
| *E05G 1/08* | (2006.01) |
| *E05G 1/06* | (2006.01) |
| *G06Q 20/40* | (2012.01) |
| *G06Q 20/18* | (2012.01) |
| *G07C 9/00* | (2020.01) |
| *E05G 1/024* | (2006.01) |
| *E05G 1/026* | (2006.01) |

(52) U.S. Cl.
CPC ............. *E05G 1/06* (2013.01); *E05G 1/024* (2013.01); *E05G 1/026* (2013.01); *G06Q 20/18* (2013.01); *G06Q 20/4014* (2013.01); *G07C 9/00182* (2013.01); *G07C 9/00912* (2013.01); *E05Y 2400/458* (2013.01); *E05Y 2600/11* (2013.01)

(58) Field of Classification Search
CPC .......... E05G 1/06; E05G 1/024; E05G 1/026; G06Q 20/18; G06Q 20/4014; G07C 9/00182; G07C 9/00912
USPC ...................................................... 340/5.73
See application file for complete search history.

(56) References Cited

U.S. PATENT DOCUMENTS

| 9,745,130 B1 | 8/2017 | Rawal |
| 9,811,784 B2 | 11/2017 | Wan et al. |
| 9,830,272 B2 | 11/2017 | Sorani et al. |
| 2006/0152339 A1* | 7/2006 | Mercier ................. G07F 17/13 340/5.73 |

(Continued)

*Primary Examiner* — Yong Hang Jiang
(74) *Attorney, Agent, or Firm* — Foley & Lardner LLP

(57) ABSTRACT

Various embodiments, relate to a system of lockers including a plurality of tracks and a plurality of walls. At least two of the plurality of walls slidably coupled to at least two of the plurality of tracks. Four of the plurality of walls form four sides of a locker cavity. The system also includes a plurality of doors. Each of the plurality of doors are oriented perpendicular to the plurality of the walls. A first door of the plurality of doors is coupleable to a second door of the plurality of doors so as to form a third door, and at least one of the plurality of doors form one side of the locker cavity. The system also includes a back wall, which forms one side of the locker cavity. The system further includes a lock for securing positions of the plurality of walls and of the plurality of doors.

19 Claims, 4 Drawing Sheets

(56) References Cited

U.S. PATENT DOCUMENTS

| | | | |
|---|---|---|---|
| 2015/0248803 A1* | 9/2015 | Geesmeier | G07D 11/13 |
| | | | 194/206 |
| 2019/0051090 A1* | 2/2019 | Goldberg | G07F 17/12 |
| 2019/0112119 A1 | 4/2019 | Alexander et al. | |
| 2019/0197178 A1 | 6/2019 | Agrawal et al. | |
| 2019/0370744 A1* | 12/2019 | Fee | G06Q 10/087 |

* cited by examiner

ADJUSTABLE LOCKER SYSTEM

CROSS-REFERENCE TO RELATED APPLICATION

This application is a continuation of U.S. patent application Ser. No. 16/177,292 filed on Oct. 31, 2018, the contents of which are incorporated herein by reference in its entirety.

BACKGROUND

Banks and other financial institutions provide a plethora of services to customers to assist in the completion of transactions and to meet the needs of the customers. For example, financial institutions support transactions that involve "in-hand" funds, for example, the withdrawal or deposit of cash. Currently, a customer may engage in the withdrawals and deposits of these funds by walking into a branch location of a financial institution and initiating the withdrawal or deposit request via interaction with a teller at the branch. However, the customer is only able to access the financial institution during operating hours, which are usually between the hours of 9 AM to 5 PM. Many customers may find these hours inconvenient and in conflict with their work schedules, requiring them to leave a job during the work day to complete the desired transaction. Some financial institution branch locations may offer an afterhours drop-box deposit service, but this is limited to availability and requires the customer to travel to a branch location that offers the service, the location possibly being far away from the customer's location. While a financial institution may have automated teller machines ("ATMs") in various locations outside of a branch location to allow the customer, at any hour of the day, to withdraw cash after authenticating at the ATM, the type of transactions may be limited to just withdraws and deposits. Despite the ability to engage in these "in-hand" fund transactions inside branch locations and at ATMs, there is a need for more flexible systems and methods to engage in these transactions, more convenience, and a more time effective method to complete these transactions.

Financial institutions also offer the use of safe deposit boxes to facilitate the storage of sensitive contents, such as coinage or documents. Safe deposit boxes generally provide storage for those items that are too sensitive or precious to be stored in less secure means. For example, many users of safe deposit boxes store their birth certificates, social security cards, or other irreplaceable identification documents in a safe deposit box where they are theoretically safe from natural disasters (such as house fires) or prying eyes. Safe deposit boxes are also used by collectors of rare stamps or coins who may wish to keep their most treasured items away from nimble fingers.

The appeal of safe deposit boxes stems from their location within banks, which are already extraordinarily secure locations, and from the effort and knowledge required to access them. For example, in order for an owner to access their safe deposit box at their local bank, the owner will typically be required to bring their own key and prove their identity to the bank teller. Then, the owner is granted access to the safe deposit box but cannot take the box out of the vault. Combined with the location in a bank, safe deposit boxes are an attractive storage option for cautious consumers.

SUMMARY

Various embodiments relate to a system of lockers. An example system of lockers includes a plurality of tracks and a plurality of walls. At least two of the plurality of walls slidably coupled to at least two of the plurality of tracks. Four of the plurality of walls form four sides of a locker cavity. The system also includes a plurality of doors. Each of the plurality of doors are oriented perpendicular to the plurality of the walls. A first door of the plurality of doors is coupleable to a second door of the plurality of doors so as to form a third door, and at least one of the plurality of doors form one side of the locker cavity. The system also includes a back wall, which forms one side of the locker cavity. The system further includes a lock for securing positions of the plurality of walls and of the plurality of doors.

Various other embodiments relate to a computing system in operative communication with an adjustable locker system. An example computing system includes an item exchange circuit structured to receive exchange parameters regarding an exchange of a physical item from a first party to a second party. The exchange parameters include at least one of a first identifier of the first party, a second identifier of the second party, and dimensions of the physical item. The computing system also includes a locker size circuit structured to determine a desired locker volume based on the dimensions of the physical item. The desired locker volume is larger than an item volume defined by the dimensions of the physical item. Locker configuration parameters are determined based on the desired locker volume. The locker configuration parameters define positions of at least one of adjustable walls or adjustable doors of the locker system so as to define a locker cavity having at least the desired locker volume. A locker size command signal is transmitted to the adjustable locker system. The locker size command signal is configured to cause at least one of the adjustable walls or the adjustable doors of the adjustable locker system to move to positions defined by the locker configuration parameters.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
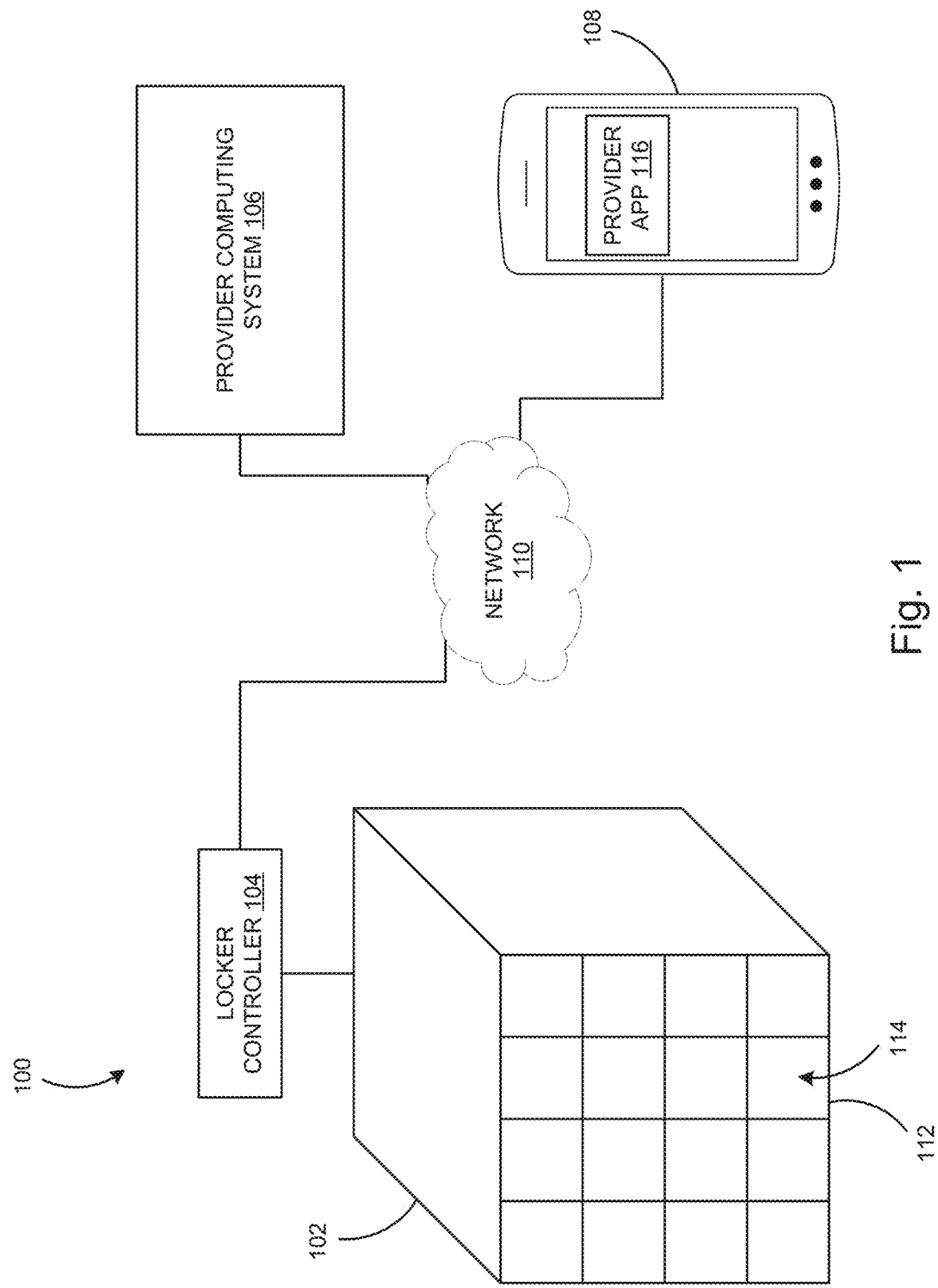
FIG. 1 is a schematic diagram of a system of secure lockers, according to an example embodiment.

Some package delivery services have begun to use locker systems to facilitate the delivery process. For apartment complexes, for example, rather than leaving packages in unsecured locations, delivery-people can deposit the packages into a locker. The locker system then sends a code (e.g. a QR code or 6-digit number) to the recipient, who can retrieve the package using the code at their convenience. In another example, Amazon allows shipment to an Amazon Locker, which is a set of lockers at a grocery store or other public space, and consumers can pick up their packages there rather than have them delivered to home. While the appeal of these systems are clear, the disadvantages are even clearer. First and foremost, these systems necessarily exist in public and non-secure locations. Whether a grocery store or lobby of an apartment building, there are no security measures in place beyond a simple password lock. Second, these systems are one-sided and only programmed for receiving packages. There is no way for a user to leave their own goods in these package lockers for a second user to later pick up in order to, for example, complete a sale.

One disadvantage of the secure locker industry across the board is the strict fixedness of locker size. For consumers, the lack of options for locker size might force them to consider a size larger than necessary, incurring unnecessary costs. By example, a particular consumer may need to store her passport, social security card, and a single rare coin. If her local bank provides only a single one-size-fits-all safe deposit box that measures 1'×2', she might forego the extra security provided by a safe deposit box because she does not want to pay for all that empty space. On the other hand, if a consumer orders a pre-assembled cabinet from an online retailer, such a cabinet may be too large for his package locker system, forcing the delivery-person to leave the cabinet out in the elements.

The disadvantages to suppliers of secure lockers are even more pressing. Having a predetermined allocation of safe deposit boxes almost certainly will result in an inefficient allocation. Renting an entire box to the someone who will only store a few documents takes away valuable space that will go unutilized. In a general sense, being locked into a business plan or allocation of resources without the ability to adjust to market trends is almost certain to end poorly for the business. In the same way, being unable to adjust the availability of secure lockers in response to demand is a recipe for failure.

Safe deposit boxes are attractive to consumers for two primary reasons: location within a bank and multi-level security. First, because the safe deposit boxes are located in a bank, they are inherently more secure than most other locations. Not only do banks provide heightened security measures, such as armed guards, reinforced doors, and high-tech camera surveillance, but there are also strict laws that target bank robbery and theft specifically. Second, accessing a safe deposit box is more complex than simply possessing the proper key, although that is often part of the process. In addition to providing their own personal key, accessors must prove their identity, and that identity must be on the list of approved accessors, which has its own laborious enrollment process. Then, the accessor may open the box and retrieve its contents, but only within the vault as the safe deposit box itself is not allowed to leave the secure area.

The method of multi-level security for a safe deposit box ensures that they are only viable for storage. While this may be acceptable for some users, not allowing a secure method of exchange leaves a large portion of consumers underserved.

Referring generally to the figures, systems and methods for an adjustable locker system are described. According to various embodiments, a system of secure lockers includes a plurality of adjustable walls and a plurality of adjustable doors defining locker cavities with configurable cavity volumes. By having a plurality of adjustable walls, the system of secure lockers is able to respond directly to consumer demand by sliding and creating different size locker cavities, obviating the space issues of a fixed-volume system. Further, the plurality of adjustable walls enable the system to tailor the locker cavities to the size desired by each individual consumer, avoiding overpayment on the user side and inefficiency on the supplier side.

The system of secure lockers described herein solves various technical problems associated with existing locker systems. For example, as noted above, one problem with existing locker systems is the constraints imposed fixed size lockers. By having adjustable walls that can move to form lockers of different sizes, the system of secure lockers is directly responsive to demand and overcomes any issues stemming from having one-size-fits-all lockers.

In addition, the system of secure lockers described herein solves the lack of exchange functionality in existing locker systems by incorporating various circuits into the computer system to facilitate exchange transactions. These circuits also facilitate the use of the system of secure lockers for storage, thereby serving a larger market of consumers than presently served by existing locker systems.

FIG. 1 is a schematic diagram of a system of secure lockers 100, according to an example embodiment. The system 100 includes a locker cabinet 102, a locker controller 104, a provider computing system 106, and a mobile computing device 108. The various systems and devices are operatively and communicatively coupled through a network 110, which may include one or more of the Internet, cellular network, Wi-Fi, Wi-Max, a proprietary banking network, or any other type of wired or wireless network or a combination of wired and wireless networks.

The locker cabinet 102 includes one or more individual lockers. For example, the locker cabinet 102 of FIG. 1 includes sixteen individual lockers 112. Various embodiments include different numbers of individual lockers 112. Further, in any particular embodiment, the number of individual lockers 112 in the locker cabinet 102 may vary depending on the configuration of the locker cabinet 102. For example, because the lockers 112 of the locker cabinet 102 are adjustable, lockers 112 can be combined or subdivided, depending on the required cavity volumes of the lockers 112. As described further in connection with FIGS. 3 and 4, each locker 112 in the locker cabinet 102 includes five walls and a door, which define a locker cavity 114 of the respective locker 112.

Figure 3:
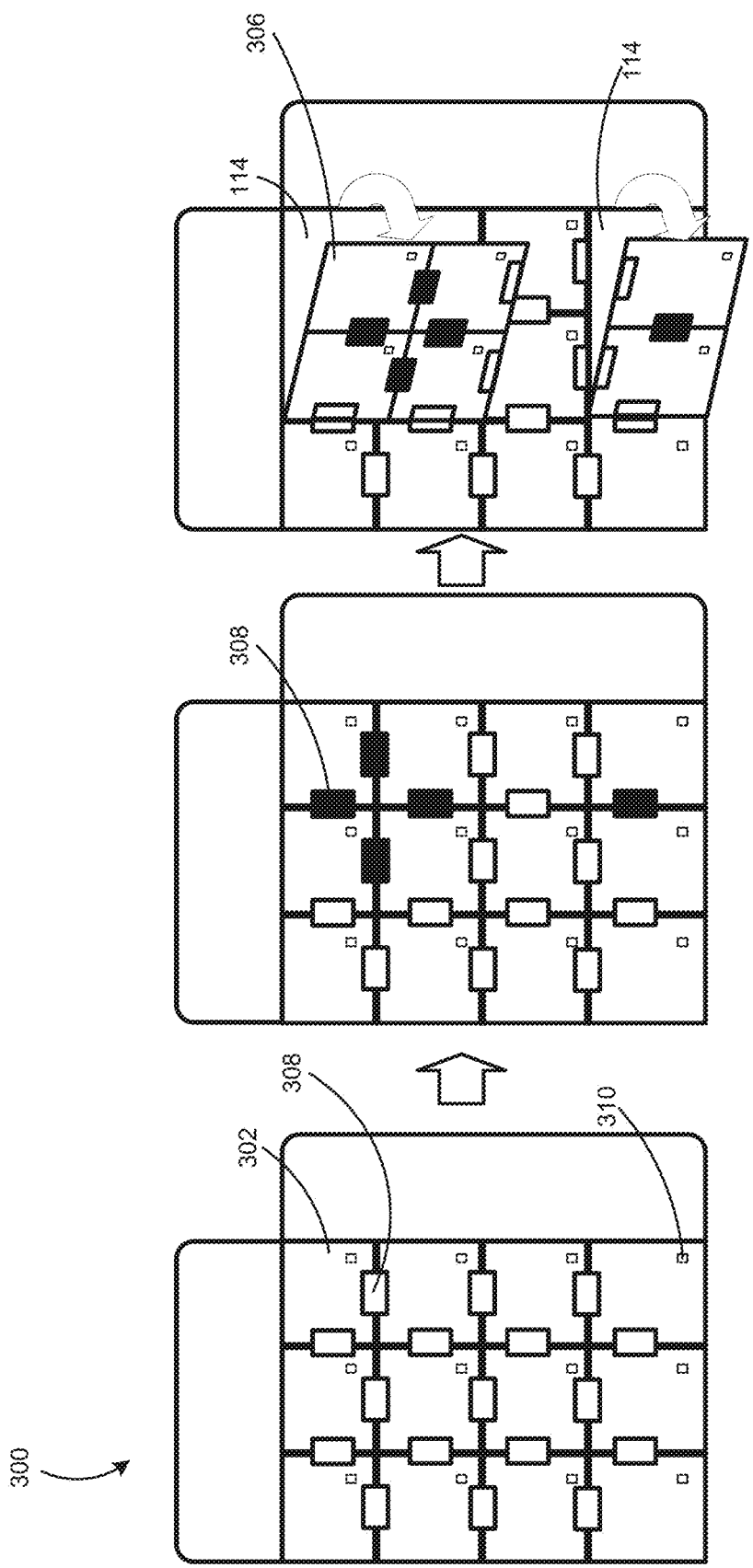
FIG. 3 is a front view of a plurality of adjustable doors for systems of secure lockers, according to various example embodiments.
Figure 4:
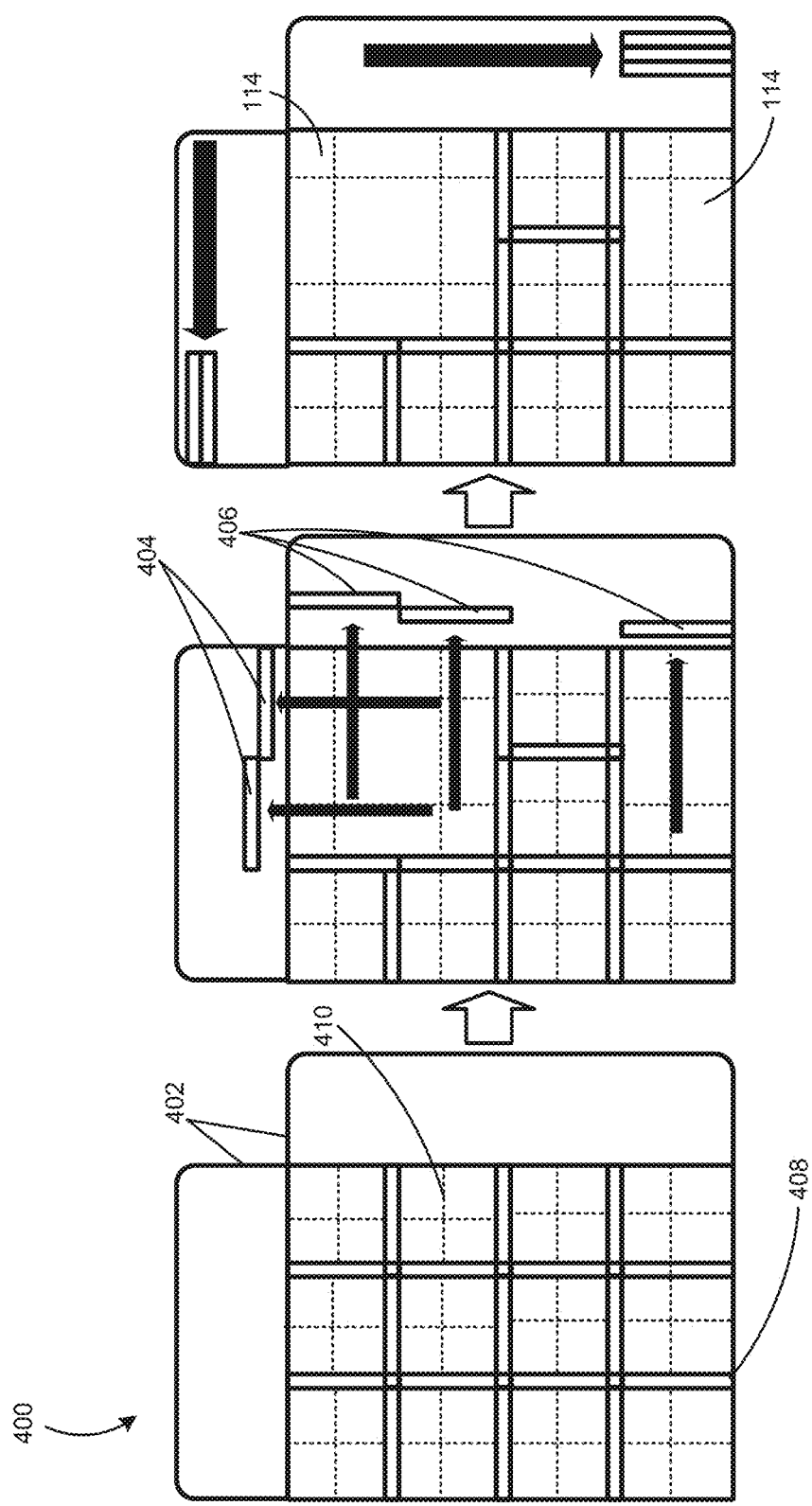
FIG. 4 is a front view of a plurality of adjustable walls and tracks for systems of secure lockers, according to various example embodiments.

The locker controller 104 is operatively coupled to the locker cabinet 102. The locker controller 104 is structured to maintain locker state information for each locker 112 in the locker cabinet 102. For example, locker state information may indicate whether a locker 112 is empty or occupied, an item included in the locker, an identity of a user permitted to access the locker, and other similar types of information. The locker controller 104, as discussed further in connection with FIGS. 3 and 4, is also structured to transmit control signals to tracks, motors, locks, and other components of the locker cabinet 102 so as to control the locker state and locker configuration of the lockers 112 of the locker cabinet 102.

In some embodiments, the locker controller 104 responds to inputs from a user. In some of these embodiments, a user selects options for different sizes or positions of lockers from a list presented on a display on the locker controller 104. In other embodiments, a user is presented with a graphical rendering or map of the locker system with real-time locker positions that can be manipulated by the user's interaction with a touch screen incorporated into the locker controller 104. In further embodiments, a user is presented with the option to conduct an exchange or transaction using the locker system, at which point the locker controller 104 initiates the proper circuit depending on the user's selection.

The locker controller 104 is communicatively and operatively coupled to the provider computing system 106 and to the mobile computing device 108 via the network 110. The locker controller 104 may receive operation commands from one or both of the provider computing system 106 and the mobile computing device 108 so as to control the state and configuration of the lockers 112. The locker controller 104 may also transmit locker state configuration information to one or both of the provider computing system 106 and the mobile computing device 108.

The provider computing system 106 is structured to control operation of the locker cabinet 102 via operative communication with the locker controller 104. The provider computing system 106 is managed by a provider entity that controls operation of the locker cabinet 102. In some embodiments, the provider computing system 106 is managed by a financial institution.

The mobile computing device 108 is structured to send commands and/or information to the locker controller 104 via a provider app 116 relating to operation of the system of secure lockers 100. For example, rather than physically going to the system of secure lockers 100 and operating the locker controller 104 from there, users can use their mobile device 108 to operate the system of secure lockers 100 remotely, ensuring that the system of secure lockers 100 is ready in advance of the users' visits.

Figure 2:
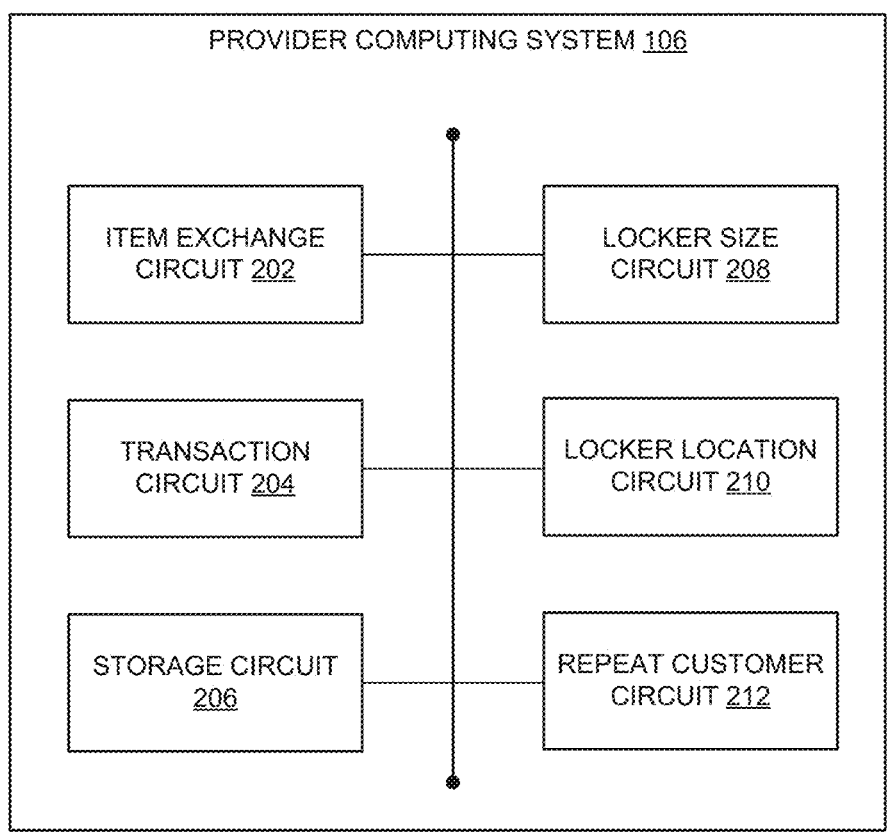
FIG. 2 is a schematic diagram of a provider computing system of the system of secure lockers of FIG. 1.

FIG. 2 is a schematic diagram of a provider computing system 106 of the system of secure lockers 100 of FIG. 1, according to an example embodiment. The provider computing system 106 includes an item exchange circuit 202, a transaction circuit 204, a storage circuit 206, a locker size circuit 208, a locker location circuit 210, and a repeat customer circuit 212.

The item exchange circuit 202, via operative communication with the locker controller 104, controls the system of secure lockers 100 so as to facilitate the exchange of a physical item from a first party to a second party. For example, in some embodiments, the item exchange circuit 202 receives inputs from either a user or the locker controller 104 regarding an exchange between two parties, and issues commands to the locker controller 104 to actuate the tracks, plurality of adjustable walls, and/or plurality of adjustable doors to create a locker of the required dimensions. The inputs can include, for example, exchange parameters, such as a first identifier of the first party, a second identifier of the second party, dimensions of the physical item, and other parameters relating to the exchange of the physical item. Once the first party initiates the exchange, the item exchange circuit 202 facilitates authentication procedures to authenticate the first party, identifies the locker for the first party, disengages the security lock to allow access to the locker, re-engages the security lock once good(s) have been deposited, and scans deposited good(s) using a camera, optical imager, or other form of visual scanner to confirm that good(s) match initial inputs. Once the second party continues the exchange, the item exchange circuit 202 facilitates authentication procedures to approve the second party, identifies the locker for the second party, disengages the security lock to allow access to the locker, re-engages the security lock once the good(s) have been removed, and scans the locker to ensure that all good(s) have been removed.

The transaction circuit 204, via operative communication with the locker controller 104, controls the system of secure lockers 100 so as to facilitate a transaction involving payment of money by one party for a physical item from another party. For example, the transaction circuit 204 can facilitate a transaction between third parties by providing a more secure method of payment than simply handing over an envelope of cash. In another example, one party to the transaction is the bank that hosts the system of secure lockers 100 that can utilize the transaction circuit 204 to conduct more routine banking transactions. In some embodiments, the transaction circuit 204 receives inputs from either a user or the locker controller 104 regarding a transaction between a seller and a buyer, calculates the locker size required for the transaction based upon the dimensions of the good(s) to be transacted, and issues commands to the tracks, plurality of adjustable walls, and plurality of adjustable doors to create a locker of the required dimensions. Once the seller initiates the transaction, the transaction circuit 204 facilitates authentication procedures to approve the seller, identifies the locker for the seller, disengages the security lock to allow access to the locker, re-engages the security lock once good(s) have been deposited, and scans using a camera, optical imager, or other form of visual scanner deposited good(s) to confirm that good(s) match initial inputs. Once the buyer continues the transaction, the transaction circuit 204 facilitates authentication procedures to approve the buyer, either receives payment from the buyer or confirms that the buyer has paid, identifies the locker for the buyer, disengages the security lock to allow access to the locker, re-engages the security lock once good(s) have been removed, and scans locker using a camera, optical imager, or other form of visual scanner to ensure that all good(s) have been removed.

The storage circuit 206, via operative communication with the locker controller 104, controls the system of secure lockers 100 so as to facilitate the safe storage and protection of a party's valuable goods. For example, in some embodiments, the storage circuit 206 receives inputs from either a user or the locker controller 104 regarding the storage of good(s) by a user and issues commands to the tracks, plurality of adjustable walls, and plurality of adjustable doors to create a locker of the required dimensions. Once the user initiates the storage process, the storage circuit 206 facilitates authentication procedures to approve the user, identifies the locker for the user, disengages the security lock to allow access to the locker, re-engages the security lock once good(s) have been deposited, and scans using a camera, optical imager, or other form of visual scanner deposited good(s) to confirm that good(s) match initial inputs. The good(s) remain stored until the user returns to withdraw them, at which point the storage circuit 206 repeats the same process as the initial storage process.

The locker size circuit 208, via operative communication with the locker controller 104, controls the system of secure lockers 100 so as to create correctly sized locker cavities 112 based on customer demand. For example, in some embodiments, the locker size circuit 208 receives inputs from either a user or the locker controller 104 regarding a desired locker size. Based on the inputs, the locker size circuit 208 determines locker configuration parameters defining positions of at least one of adjustable walls or adjustable doors of the locker system so as to define a locker cavity having at least the desired locker volume. The locker size circuit 208 issues commands including the configuration parameters to the tracks 410, the plurality of adjustable walls, and the plurality of adjustable doors to position them in such a way as to create a locker of the desired dimensions. In some of these embodiments, the inputs are specific dimensions, for example 2'×3'. In other of these embodiments, the inputs are a number of locker units, for example 2 locker units×3 locker units, where a locker unit is the smallest possible size for a locker. In further of these embodiments, the inputs are specified goods, materials, or other prospective locker contents. If so, the locker size circuit 208 calculates the required dimensions based upon the locker contents. These calculations can be based upon stored values, for example a binder is 3"×12", upon visual information, for example a scan of a binder by a camera, optical imager, or other form of visual scanner. In another embodiment, the stored values are defined in a look-up table for various types of items commonly exchanged via the system of secure lockers 100. For example, in one embodiment, the first party is a bank and the second party is a customer of the bank. The customer initiates a change order to receive a certain amount of physical currency, such as cash notes and/or rolls of coins. The locker size circuit 208 is structured to calculate the required dimensions based on a combined total volume of all of the physical currency to be exchanged in the transaction.

The locker location circuit 210, via operative communication with the locker controller 104, controls the system of secure lockers 100 so as to position locker cavities 112 in optimal locations based on customer usage and sensitivity of contents. For example, in some embodiments, the locker location circuit 210 receives inputs from either a user or the locker controller 104 regarding a desired locker location. Some users might require a locker that is located more closely to the ground due to the users' height restrictions. In addition, it would be more efficient to place the less-often used lockers or lockers storing high-value items higher up in the locker cabinet 102 so as to reserve easier reached spaces for more-often used lockers. For example, a locker access location may be no greater than five feet from a floor on which the system of secure lockers 110 is located, and a locker storage location may at least six feet from the floor. It should be appreciated that these examples are illustrative only and are not intended to be limiting. Based on the inputs, the locker location circuit 210 issues commands to the tracks, plurality of adjustable walls, and plurality of adjustable doors to position them in such a way as to locate a locker in the desired location. In some of these embodiments, the inputs are specific coordinates that are directly input into the locker location circuit 210. In other of these embodiments, the inputs are coordinates generated by the internal logic of the locker location circuit 210 that analyzes the patterns of usage of the lockers to determine which lockers are used less frequently so as to locate those lockers in less accessible areas. In one embodiment, the locker location circuit 210 is structured to move the locker to the locker storage location in response to determining that a first party has placed a physical item in the locker cavity and the lock has been re-engaged. The locker location circuit 210 is also structured to move the locker to the locker access location in response to determining that the second party is within a predetermined proximity of the system of secure lockers 100.

The repeat customer circuit 212, via operative communication with the locker controller 104, controls the system of secure lockers 100 in order to anticipate customer demand and better meet their needs. For example, in some embodiments, the repeat customer circuit 212 reviews customer data, identifies patterns in customer behavior, and predicts future customer interaction. By predicting how customers will act in advance, the repeat customer circuit 212 can prepare a locker with proper dimensions and location, through the locker size circuit 208 and locker location circuit 210, without advance notice from the particular repeat customer. Then, when the customer does arrive, the repeat customer circuit 212 initiates the correct circuit, either the transaction circuit 204, item exchange circuit 202, storage circuit 206, or another circuit, to complete the customer's order. For example, the repeat customer circuit 212 would recognize that the coffee shop manager picks up eight rolls of quarters every Monday morning at 9 A.M. Then, the repeat customer circuit 212 would determine a proper size of a locker for holding eight rolls of quarters and prepare a locker having the proper size by 9 A.M. on Monday morning. When the coffee shop manager arrives at the system of secure lockers 100, his order is ready immediately. In some embodiments, the repeat customer circuit 212 pre-stages the locker with an anticipated change order, but does not provide access to the customer until the customer's change order has been received and approved.

FIG. 3 is a front view of a plurality of adjustable doors 300 for systems of secure lockers 100, according to various example embodiments. The plurality of adjustable doors 300 include an adjustable door 302, a plurality of hinges 308, a coupled door 306, and a security lock 310.

The adjustable door 302 is structured to form at least one wall of the locker cavity. In some embodiments, the adjustable door 302 forms the front (from the perspective of the front of the locker cabinet 102) wall of each locker 112. In other embodiments, the adjustable door 302 also forms the back wall of each locker 112. Various embodiments include a different number of adjustable doors 302. The embodiment shown in FIG. 3 has twelve adjustable doors 302. In some example embodiments, each adjustable door 302 is selectively coupleable to at least one adjacent adjustable door 302 with at least one of a plurality of hinges 308.

The plurality of hinges 308 is structured to allow each adjustable door 302 to swing open. In addition, the plurality of hinges 308 are selectively controlled between a locked position and an unlocked position. In the unlocked position, the hinges 308 are free to rotate such that one adjustable door 302 can be rotated (e.g., opened or closed) relative to another of the adjustable doors 302. In the locked position, one adjustable door 302 is fixed to another of the adjustable doors 302. In this way, two or more of the plurality of adjustable doors 300 can form a coupled door 306 and move in unison to operate as a single door such as would be needed for a larger-sized locker 112. In some embodiments, the plurality of hinges 308 lock via electromagnets that engage to prevent the interlocked portions of the plurality of hinges 308 from rotating. In other embodiments, a tightening bolt passes through the joints of the plurality of hinges and clamps the interlocked portions of the plurality of hinges together to prevent movement. In further embodiments, a pin extends perpendicularly to the joint and prevents the interlocked portions from rotating.

The coupled door 306 is structured to operate as a single door for larger-sized locker 112. The coupled door 306 is formed by one or more adjustable doors 302 being fixed in place by the plurality of hinges 308 that connect the adjustable doors 302. Various embodiments include a different number of coupled doors 306, and various embodiments include a different number of adjustable doors 302 that are fixed in place to form a coupled door 306. For example, the locker cabinet 102 shown in FIG. 3 features two coupled doors 306, one of which is formed of four adjustable doors 302 and one of which is formed of two adjustable doors 302.

In an example embodiment, the plurality of adjustable doors 300 retract into the locker cabinet 102 in a similar manner to how garage doors retract upwards into the ceiling of a garage. In these embodiments, the plurality of adjustable doors 300 would be able to retract in any direction such as to operate as a door for even those lockers located in the middle of the locker cabinet 102. In some embodiments, the plurality of adjustable doors 300 retract as a single unitary panel. In other embodiments, the plurality of adjustable doors 300 retract as individual panels. Some embodiments include one or both arrangements, depending on the size of door needed to access a particular locker. In some of these example embodiments, the plurality of adjustable doors 300 retract by sliding along tracks (which will be described in more detail below). In other of these example embodiments, the plurality of adjustable doors 300 retract by folding onto themselves like an accordion.

In other embodiments (not pictured), the plurality of adjustable doors 300 are made up of slats jointed together that run either vertically from top to bottom or horizontally from left to right. Depending on the location and size of locker 112 to be opened, the plurality of adjustable doors 300 would rotate like window blinds to allow access. Multiple doors of the plurality of adjustable doors 300 can rotate in unison as a coupled door 306 for larger lockers, or just a single adjustable door 302 can rotate.

The security lock 310 is structured to prevent the plurality of adjustable doors 300 from being opened in an unauthorized manner. In some embodiments, the security lock 310 is a deadbolt that extends from an adjustable door 302 or coupled door 306 into the frame of the locker cabinet 102 or another of the plurality of adjustable doors 300, preventing the adjustable door 302 or coupled door 306 from moving while the security lock 310 is engaged. In some of these embodiments, the deadbolt responds to a physical key that is inserted into the security lock 310, while in other embodiments, the deadbolt responds to an internal mechanism controlled by the locker controller 104.

In other embodiments, the security lock 310 is an electromagnet located on an adjustable door 304 that magnetically couples to the frame of the locker cabinet 102 or another adjustable door 304, preventing the adjustable door 304 from moving while engaged.

FIG. 4 is a front view of a plurality of adjustable walls 400 and tracks 410 for a system of secure lockers 100, according to various example embodiments. The plurality of adjustable walls include an adjustable wall 408, a horizontal plurality of walls 404, a vertical plurality of walls 406, a plurality of locker compartments 402, and tracks 410.

The vertical plurality of adjustable walls 406 include those adjustable walls 408 that are oriented vertically. The horizontal plurality of adjustable walls 404 include those adjustable walls 408 that are oriented horizontally. In some embodiments, these orientations are fixed such that the plurality of adjustable walls 400 cannot rotate in order to keep the corners of the locker cavities 114 at 90 degrees. In other embodiments, these orientations are not fixed and the walls are allowed to rotate but only in 90 degree increments, such that at least one of the horizontal plurality of adjustable walls 404 may join the vertical plurality of adjustable walls 406, and at least one of the vertical plurality of adjustable walls 406 may join the horizontal plurality of adjustable walls 404 in order to respond to demand for more such walls. In other embodiments, these orientations are not fixed and the plurality of adjustable walls 400 are allowed to rotate to any angle, such that the locker cavities 114 are formed of non-rectangular prisms. Allowing non-rectangular locker cavities 114 is an advantage over the currently-existing technology, especially for providing exchange transactions between third parties, where the items to be exchanged are often irregularly shaped.

The plurality of locker compartments 402 are structured to receive the plurality of adjustable walls 400. When not needed to form locker cavities 114, the plurality of adjustable walls are retractable into the sides of the locker cabinet 102 such that the adjustable walls are stored inside a plurality of compartments 402 until needed to divide the space within the locker cabinet 102 into locker cavities 114. In some of these embodiments, the plurality of adjustable walls 400 are structured to stack with similarly oriented walls (e.g., vertical walls would stack with other vertical walls). In other of these embodiments, the plurality of adjustable walls 400 are structured to be stacked together regardless of displayed orientation. In this way, the plurality of adjustable walls 400 can be temporarily removed from the useable space, further increasing the efficiency of the system of secure lockers 100 by allowing more efficient spatial utilization.

In those embodiments where the plurality of adjustable walls 400 are stored within a plurality of compartments 402, the plurality of compartments 402 are located on each of the far edges of the locker cabinet 102 or, in other embodiments, on only one side of the locker cabinet 102. Some embodiments include a single compartment from a plurality of compartments 402 that stores all of the unused adjustable walls or, in other embodiments, there is a compartment from a plurality of compartments 402 for each row and column. Other embodiments include at least one of the plurality of compartments 402 for only the vertical plurality of adjustable walls 406 and at least one of the plurality of compartments 402 for only the horizontal plurality of adjustable walls 404.

Further, in such example embodiments, the plurality of compartments 402 are located to the rear of the locker system such that the adjustable walls retract along their thinnest profile. In other embodiments, the plurality of compartments 402 are located on the left, right, top, or bottom (from the perspective of the front of the locker system) of the locker system such that the adjustable walls retract along their thickest profile.

In other example embodiments, the adjustable walls fold out from the locker system such that the walls are recessed into the rear of the locker cabinet 102 until used, like a Murphy bed. In these embodiments, the plurality of adjustable walls 400 are recessed into any side of the locker cabinet 102.

The tracks 410 are structured to guide movement of the plurality of adjustable walls 400 to facilitate not only ease but also accuracy of the position adjustment. In some of these embodiments, the plurality of adjustable walls 400 are coupled to the tracks 410 by wheels, extending from the plurality of adjustable walls 400, that are slotted onto the tracks 410 or by linear bearings on the plurality of adjustable walls 400 and/or the tracks 410. In other of these embodiments, the tracks 410 comprise a sliding magnet that couples to the plurality of adjustable walls 400, which are magnetic in these embodiments, and the magnets move along the tracks 410, moving the plurality of adjustable walls 400 alongside.

In an example embodiment, the system of secure lockers 100 includes position locks that prevent the plurality of adjustable walls 400 from moving once they have reached their proper position. When these position locks are engaged, the plurality of adjustable walls 400 are locked into position, which not only ensures the safety of the lockers' contents by keeping them from being crushed by moving walls but also ensures the security of the system by not allowing access to a single locker to lead to access to multiple lockers. The position locks would prevent a user from accessing a locker, manually moving one of the walls of the locker, and breaking into an adjacent locker.

In some embodiments, the position locks are electromagnets that magnetically engage to the plurality of adjustable walls 400 to prevent movement. These electromagnets can be placed anywhere on the locker cabinet 102, for example on the frame of the locker cabinet 102 or on the tracks 410. In other embodiments, the position locks are rods that protrude from the locker cabinet 102 and prevent movement of the plurality of adjustable walls 400.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A system of lockers comprising:
   a plurality of tracks;
   a plurality of walls, at least two of the plurality of walls slidably coupled to at least two of the plurality of tracks, and four of the plurality of walls forming four sides of a locker cavity;
   a plurality of doors, each of the plurality of doors being oriented perpendicular to the plurality of walls, wherein a first door of the plurality of doors is coupleable to a second door of the plurality of doors so as to form a third door, and wherein at least one of the plurality of doors form one side of the locker cavity;
   a back wall, the back wall forming one side of the locker cavity;
   a position lock for securing positions of the plurality of walls and of the plurality of doors;
   a security lock for selectively locking the at least one of the plurality of doors forming the one side of the locker cavity;
   an item exchange circuit structured to receive exchange parameters regarding an exchange of a physical item from a bank to a customer, wherein the exchange parameters are defined by a transaction request submitted by the customer to the bank, the transaction request comprising a request to withdraw physical currency from an account that the customer holds with the bank, the exchange parameters comprising at least one of a first identifier of the bank, a second identifier of the customer, and dimensions of the physical item; and
   a locker size circuit structured to:
      determine a desired locker volume based on the dimensions of the physical item, the desired locker volume being larger than an item volume defined by the dimensions of the physical item,
      determine locker configuration parameters based on the desired locker volume, the locker configuration parameters defining positions of at least one of the plurality of walls or the plurality of doors of the system of lockers so as to define the locker cavity having at least the desired locker volume, and
      transmit, to the system of lockers, a locker size command signal configured to cause at least one of the plurality of walls or the plurality of doors of the system of lockers to move to positions defined by the locker configuration parameters.

2. The system of lockers of claim 1, wherein the plurality of walls comprise:
   a first plurality of walls oriented in vertical orientations so as to define a first side wall and a second side wall of the locker cavity, and
   a second plurality of walls oriented in horizontal orientations so as to define a top wall and a bottom wall of the locker cavity, the locker cavity having a locker volume as defined by the first side wall, the second side wall, the top wall, the bottom wall, the back wall, and the at least one of the plurality of doors.

3. The system of lockers of claim 2, wherein the plurality of tracks comprise:
   a first plurality of tracks oriented in fixed vertical orientations so as to allow movement of the first plurality of walls, and
   a second plurality of tracks oriented in fixed horizontal orientations so as to allow movement of the second plurality of walls.

4. The system of lockers of claim 1, wherein the locker size circuit is operatively coupled to at least one of the plurality of tracks so as to controllably adjust a position of at least one of the plurality of walls to modify a locker volume of the locker cavity.

5. The system of lockers of claim 1, wherein the locker size circuit is operated by a user and responds to user inputs for defining the desired locker volume.

6. The system of lockers of claim 1, wherein the locker size circuit is configured to receive a computer input from a computer system for defining the desired locker volume.

7. The system of lockers of claim 1, wherein the locker size circuit is configured to receive data corresponding to the dimensions of the physical item to be maintained in the locker cavity.

8. The system of lockers of claim 1, wherein the item exchange circuit is configured to:
   receive, from the bank, first authentication credentials;
   authenticate the bank based on the first identifier and the first authentication credentials;
   in response to authenticating the bank, disengage the security lock so as to provide the bank access to the locker cavity; and
   in response to determining that the physical item has been placed into the locker cavity, re-engage the security lock.

9. The system of lockers of claim 8, wherein the item exchange circuit is further configured to:
   receive, from the customer, second authentication credentials;
   authenticate the customer based on the second identifier and the second authentication credentials; and
   in response to the authenticating the customer, disengage the security lock so as to provide the customer access to the locker cavity.

10. The system of lockers of claim 9, wherein the security lock is disengaged further in response to receiving a payment signal indicating payment for the physical item from the customer to the bank.

11. A computing system in operative communication with an adjustable locker system, the computing system comprising:
- an item exchange circuit structured to receive exchange parameters regarding an exchange of a physical item from a bank to a customer of the bank, the exchange parameters defined by a transaction request submitted by the customer to the bank, the transaction request comprising a request to withdraw physical currency from an account that the customer holds with the bank, the exchange parameters comprising at least one of a first identifier of the bank, a second identifier of the customer, and dimensions of the physical item; and
- a locker size circuit structured to:
  - determine a desired locker volume based on the dimensions of the physical item, the desired locker volume being larger than an item volume defined by the dimensions of the physical item,
  - determine locker configuration parameters based on the desired locker volume, the locker configuration parameters defining positions of at least one of adjustable walls or adjustable doors of the adjustable locker system so as to define a locker cavity having at least the desired locker volume, and
  - transmit, to the adjustable locker system, a locker size command signal configured to cause at least one of the adjustable walls or the adjustable doors of the adjustable locker system to move to positions defined by the locker configuration parameters.

12. The system of claim 11, further comprising a transaction circuit, the transaction circuit structured to process a payment of the physical item from the customer to the bank.

13. The system of claim 11, wherein the item exchange circuit is further structured to:
- receive, from the bank, first authentication credentials;
- authenticate the bank based on the first identifier and the first authentication credentials;
- in response to the authenticating the bank, disengage a security lock of the adjustable locker system so as to provide the bank access to the locker cavity; and
- in response to determining that the physical item has been placed into the locker cavity, re-engage the security lock.

14. The system of claim 13, wherein the item exchange circuit is further structured to:
- receive, from the customer, second authentication credentials;
- authenticate the customer based on the second identifier and the second authentication credentials; and
- in response to the authenticating the customer, disengage the security lock so as to provide the customer access to the locker cavity.

15. The system of claim 13, further comprising a locker location circuit structured to:
- in response to re-engaging the security lock, transmit, to the adjustable locker system, a locker location command signal configured to cause a locker of the adjustable locker system to move to a locker storage location, the locker storage location being at least six feet above a surface upon which the adjustable locker system is positioned.

16. The system of claim 15, wherein the locker location circuit is further structured to:
- determine that the customer is within a predetermined proximity of the adjustable locker system; and
- in response to the determining that the customer is within the predetermined proximity, transmit a second locker location command signal configured to cause the locker to move to a locker access location, the locker access location being no greater than five feet above the surface.

17. The system of claim 11, wherein the item volume comprises a combined total volume of all of the physical currency defined in the transaction request.

18. The system of claim 11, further comprising:
- a repeat customer circuit structured to predict a future transaction based on prior transactions between the bank and the customer, the future transaction relating to the exchange of the physical item from the bank to the customer on a first time of a first day,
- wherein the locker size command signal is transmitted by the locker size circuit to the adjustable locker system a predetermined amount of time before the first time of the first day.

19. A computing system in operative communication with an adjustable locker system, the computing system comprising:
- the adjustable locker system having at least one of adjustable walls or adjustable doors configured to be controlled to modify a locker volume of at least one locker of the adjustable locker system;
- an item exchange circuit structured to receive exchange parameters regarding an exchange of a physical item from a bank to a customer of the bank, the exchange parameters defined by a transaction request submitted by the customer to the bank, the transaction request comprising a request to withdraw physical currency from an account that the customer holds with the bank, the exchange parameters comprising at least one of a first identifier of the bank, a second identifier of the customer, and dimensions of the physical item;
- a locker size circuit communicably coupled to the adjustable locker system and the item exchange circuit, the locker size circuit structured to:
  - receive the dimensions of the physical item to be maintained in the at least one locker of the adjustable locker system;
  - determine a desired locker volume based on the received dimensions of the physical item;
  - determine locker configuration parameters based on the desired locker volume, the locker configuration parameters defining positions of the at least one of the adjustable walls or the adjustable doors of the adjustable locker system so as to define a locker volume of the at least one locker to have at least the desired locker volume; and
  - transmit, to the adjustable locker system, a locker size command signal configured to cause the at least one of the adjustable walls or the adjustable doors of the adjustable locker system to move to positions defined by the locker configuration parameters.

* * * * *